(12) United States Patent
Das

(10) Patent No.: US 11,182,184 B2
(45) Date of Patent: Nov. 23, 2021

(54) IMPLEMENTING HIGH-PERFORMANCE VIRTUAL MACHINES FOR BARE METAL SIMULATION

(71) Applicant: Red Hat, Inc., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 16/661,224

(22) Filed: Oct. 23, 2019

(65) Prior Publication Data

US 2021/0124601 A1   Apr. 29, 2021

(51) Int. Cl.
  *G06F 9/455*   (2018.01)
(52) U.S. Cl.
  CPC ...... *G06F 9/45541* (2013.01); *G06F 9/45558* (2013.01); *G06F 2009/45575* (2013.01)
(58) Field of Classification Search
  CPC ............. G06F 9/45541; G06F 9/45558; G06F 2009/45575
  See application file for complete search history.

(56) References Cited

U.S. PATENT DOCUMENTS

| | | | |
|---|---|---|---|
| 9,747,123 B2 | 8/2017 | Nakajima et al. | |
| 10,055,248 B1* | 8/2018 | Tsirkin | G06F 3/0653 |
| 10,303,899 B2 | 5/2019 | Durham et al. | |
| 2006/0075402 A1* | 4/2006 | Neiger | G06F 9/45558 718/1 |
| 2007/0157197 A1* | 7/2007 | Neiger | G06F 9/4812 718/1 |
| 2013/0346966 A1* | 12/2013 | Natu | G06F 11/3409 718/1 |
| 2014/0082240 A1* | 3/2014 | Coleman | G06F 9/45558 710/260 |
| 2014/0173600 A1 | 6/2014 | Nair | |

(Continued)

FOREIGN PATENT DOCUMENTS

CN   100568181 C   12/2009

OTHER PUBLICATIONS

Agesen, Ole, et al., "Software Techniques for Avoiding Hardware Virtualization Exits," Technical Report VMware-TR-2011-001, Aug. 2011, VMware, Inc., 26 pages.

(Continued)

*Primary Examiner* — Dong U Kim
(74) *Attorney, Agent, or Firm* — Withrow & Terranova, PLLC

(57) ABSTRACT

Implementing high-performance virtual machines for bare metal simulation is disclosed. A hypervisor executing on a host computer receives a request to initiate a high-performance (HP) virtual machine (VM). The hypervisor selects, based on the request, a HP virtual machine exit (VMEXIT) configuration from a plurality of different VMEXIT configurations. Each respective VMEXIT configuration of the plurality of different VMEXIT configurations identifies VMEXIT behavior in response to a task executing in a VM having a virtual machine control structure (VMCS) generated based on the respective VMEXIT configuration. The hypervisor generates a HP VMCS for the HP VM based on the HP VMEXIT configuration, the HP VMCS controlling the VMEXIT behavior in response to a task executing in the HP VM. The hypervisor initiates the HP VM.

20 Claims, 4 Drawing Sheets

(56) References Cited

U.S. PATENT DOCUMENTS

2017/0249261 A1    8/2017  Durham et al.

OTHER PUBLICATIONS

Landau, Alex, et al., "SplitX: Split Guest/Hypervisor Execution on Multi-Core," 3rd Conference on I/O Virtualization, Jun. 2011, USENIX Association, 7 pages.
Uhlig, Rich, et al., "Intel Virtualization Technology," Computer, 2005, IEEE Computer Society, pp. 48-56.

* cited by examiner

IMPLEMENTING HIGH-PERFORMANCE VIRTUAL MACHINES FOR BARE METAL SIMULATION

BACKGROUND

Virtualization technologies, such as virtual machine technologies, are increasingly popular because they allow more efficient utilization of a host computer by allowing multiple independent computing environments to run on a single host computer. A virtual machine monitor, sometimes referred to herein as a hypervisor, executes between the "bare metal" of the host computer, i.e., the processor cores and the memory of the host computer and the VMs, and manages and otherwise coordinates access to the processor cores and the memory by the VMs running on the host computer.

SUMMARY

The examples disclosed herein implement high-performance virtual machines for bare metal simulation. In particular, the examples disclosed herein implement a virtualized host computer that, upon request, configures a high-performance VM that results in fewer VMEXITS than a normal-performance VM.

In one example a method is provided. The method includes receiving, by a hypervisor executing on a host computer, a request to initiate a high-performance (HP) virtual machine (VM). The method further includes selecting, based on the request, a HP virtual machine exit (VMEXIT) configuration from a plurality of different VMEXIT configurations, each respective VMEXIT configuration of the plurality of different VMEXIT configurations identifying VMEXIT behavior in response to a task executing in a VM having a virtual machine control structure (VMCS) generated based on the respective VMEXIT configuration. The method further includes generating a HP VMCS for the HP VM based on the HP VMEXIT configuration, the HP VMCS controlling the VMEXIT behavior in response to a task executing in the HP VM. The method further includes initiating the HP VM.

In another example a host computer is provided. The host computer includes a memory, and a processor device coupled to the memory. The processor device is to receive, by a hypervisor, a request to initiate a high-performance (HP) virtual machine (VM). The processor device is further to select, based on the request, a HP virtual machine exit (VMEXIT) configuration from a plurality of different VMEXIT configurations, each respective VMEXIT configuration of the plurality of different VMEXIT configurations identifying VMEXIT behavior in response to a task executing in a VM having a virtual machine control structure (VMCS) generated based on the respective VMEXIT configuration. The processor device is further to generate a HP VMCS for the HP VM based on the HP VMEXIT configuration, the HP VMCS controlling the VMEXIT behavior in response to a task executing in the HP VM. The processor device is further to initiate the HP VM.

In another example a computer program product is provided. The computer program product is stored on a non-transitory computer-readable storage medium and includes instructions to cause a processor device to receive, by a hypervisor, a request to initiate a high-performance (HP) virtual machine (VM). The instructions further cause the processor device to select, based on the request, a HP virtual machine exit (VMEXIT) configuration from a plurality of different VMEXIT configurations, each respective VMEXIT configuration of the plurality of different VMEXIT configurations identifying VMEXIT behavior in response to a task executing in a VM having a virtual machine control structure (VMCS) generated based on the respective VMEXIT configuration. The instructions further cause the processor device to generate a HP VMCS for the HP VM based on the HP VMEXIT configuration, the HP VMCS controlling the VMEXIT behavior in response to a task executing in the HP VM. The instructions further cause the processor device to initiate the HP VM.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
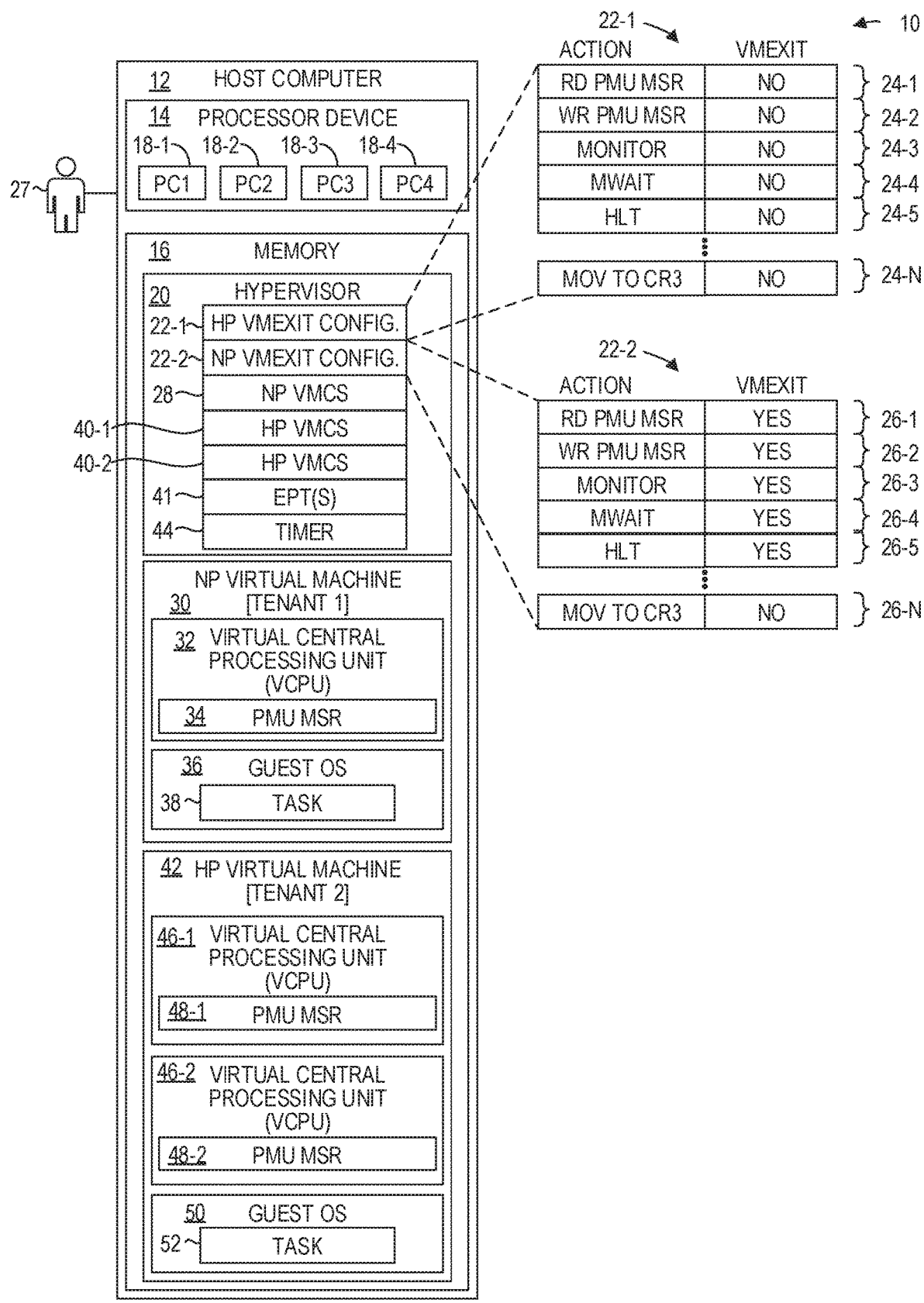
FIG. 1 is a block diagram of an environment in which a high-performance virtual machine for bare metal simulation can be implemented.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtualization technologies, such as virtual machine (VM) technologies, are increasingly popular because they allow more efficient utilization of a host computer by allowing multiple independent computing environments to run on a single host computer. A virtual machine monitor, sometimes referred to herein as a hypervisor, executes between the "bare metal" of the host computer, i.e., the processor cores and the memory of the host computer and the VMs, and manages and otherwise coordinates access to the processor cores and the memory by the VMs running on the host computer. Among other environments, VMs are widely used by cloud computing providers that provide on-demand computing services to multiple tenants (i.e., customers).

While modern processor devices incorporate virtualization technology into the processor device itself to allow VMs to execute relatively efficiently, in order to ensure that one VM does not negatively impact another VM running on the same host computer, the hypervisor typically configures the virtual machine control structure (VMCS) of a VM to cause a VM exit (VMEXIT) upon certain events, such as interrupts from external devices, or the execution of certain processor instructions, such as execution of an x86 MONITOR instruction, an x86 WAIT instruction, and an x86 HLT instruction, if attempted by a task executing in the VM. A VMEXIT is an immediate transfer of control from a task to the hypervisor, which occurs in response to an event identified in a corresponding VMCS, such as a task attempting to execute an instruction, in lieu of the processor device actually performing the instruction. The hypervisor can then safely determine the appropriate action to take, such as routing an interrupt to a particular location, or performing a desired instruction, or terminating the task, or the like.

As used herein, the phrase VMEXIT event refers to any event that causes a VMEXIT. As will be discussed in greater detail below, VMEXIT events can comprise the attempted execution of certain processor instructions, and hardware interrupts. Because transfer controls from a task in a VM to a hypervisor upon a VMEXIT event, such events slow down the execution of the process. Because many such events are permitted in a bare metal environment, a task may execute slower in a VM environment than when executing in a bare metal environment. The phrase "bare metal environment" as used herein refers to a host computer that is not running VM virtualization software, and thus no hypervisor executes between a task and the processor cores and memory of the host computer.

In many situations, an entity that utilizes a virtualized environment, such as a customer of a cloud computing provider, may desire that a task operate in a virtualized environment that is as close to a bare metal machine environment as possible. For example, the entity may desire to take benchmarks of a task that more closely approximates the benchmarks on a bare metal machine than in a conventional virtualized environment. As another example, a task may be programmed to take many actions that would typically cause a VMEXIT in a virtualized environment, but would execute much faster if such actions did not cause a VMEXIT. Moreover, it may be desirable for a cloud computing provider to be able to partition the hardware of a host computer such that different hardware resources of the same host computer can be shared among different customers rather than assigning an entire host computer to a single customer.

The examples disclosed herein implement high-performance virtual machines for bare metal simulation. In particular, the examples disclosed herein implement a virtualized host computer that, upon request, configures a high-performance VM that results in fewer VMEXITs than a normal-performance VM.

FIG. 1 is a block diagram of an environment 10 in which examples disclosed herein can be implemented. In some implementations, the environment 10 may be a cloud computing environment, but the examples disclosed herein are not limited to a cloud computing environment. The environment 10 includes a host computer 12, which in turn includes a processor device 14 and a memory 16. The processor device 14 comprises four processor cores 18-1-18-4 (PC1, PC2, PC3, and PC4, respectively.) The processor device 14 may comprise any suitable processor device, such as, by way of non-limiting example, Intel® processor devices and AMD® processor devices.

A virtual machine monitor, referred to herein as a hypervisor 20, implements a virtualized environment via VM virtualization technology on the host computer 12. The VM virtualization technology may comprise, by way of non-limiting example, Red Hat Enterprise Linux virtualization technology, VMware® virtualization technology, Microsoft® Hyper-V virtualization technology, Oracle VM Server for SPARC virtualization technology, or the like.

It will be noted that because the hypervisor 20 is a component of the host computer 12, functionality implemented by the hypervisor 20 may be attributed to the host computer 12 generally. Moreover, because the hypervisor 20 comprises software instructions that program the processor device 14 to carry out functionality discussed herein, functionality implemented by the hypervisor 20 may be attributed herein to the processor device 14.

The hypervisor 20 maintains, in this example, two VMEXIT configurations, a high-performance (HP) VMEXIT configuration 22-1, and a normal-performance (NP) VMEXIT configuration 22-2. The hypervisor 20 utilizes either the HP VMEXIT configuration 22-1 or the NP VMEXIT configuration 22-2 to generate a VMCS prior to initiating a new VM on the host computer 12. A VMCS is a collection of information which, among other things, is used by the hypervisor 20 and virtualization hardware of the processor device 14 to implement virtualization on the host computer 12. A VMCS identifies, among other things, what actions of a VM will result in a VMEXIT to the hypervisor 20. In some processor architectures, such as an Intel® processor architecture, a VMCS is referred to as a VMCS. In other processor architectures, such as an AMD® processor architecture, a VMCS is referred to as a virtual machine control block (VMCB). The examples disclosed herein are not limited to any particular processor architecture and have applicability to any processor architecture that implements virtualization via one or more data structures that control VMEXIT behavior.

The HP VMEXIT configuration 22-1 contains a plurality of entries 24-1-24-N (generally, entries 24). Each entry identifies an action, and indicates whether or not such action causes a VMEXIT. The entry 24-1 indicates that a read operation on a performance monitoring unit (PMU) model specific register (MSR) will not result in a VMEXIT. The entry 24-2 indicates that a write operation to a PMU MSR will not result in a VMEXIT. The entry 24-3 indicates that execution of an x86 instruction set MONITOR instruction will not result in a VMEXIT. The entry 24-4 indicates that execution of an x86 instruction set MWAIT instruction will not result in a VMEXIT. The entry 24-5 indicates that execution of an x86 instruction set HLT (halt) instruction will not result in a VMEXIT. The entry 24-N indicates that execution of an x86 instruction set MOV to CR3 instruction will not result in a VMEXIT. It will be appreciated that entries 24 only identify examples of the types of actions or events that may cause a VMEXIT, and do not identify all such types of actions or events. In addition to those identified in the entries 24, instructions such as CPUID, RDMSR, WRMSR, INVLPG, RDPMC, RDTSC, PAUSE, VMCALL may be identified as actions that do not cause a VMEXIT.

Moreover, certain types of interrupts may be identified by the entries 24 as not causing a VMEXIT.

The NP VMEXIT configuration 22-2 contains a plurality of entries 26-1-26-N (generally, entries 26). Like the HP VMEXIT configuration 22-1, each entry 26 identifies an action, and indicates whether or not such action causes a VMEXIT. In this example, the entries 26-1-26-N correspond directly to the same actions identified in the entries 24-1-24-N, respectively, and each entry 26 indicates that the corresponding action will cause a VMEXIT. Note that the HP VMEXIT configuration 22-1 identifies a fewer number of actions that cause a VMEXIT than the NP VMEXIT configuration 22-2.

For purposes of illustration, assume that the hypervisor 20 receives a request to initiate a NP VM on the host computer 12. The request may be programmatic, such as from a scheduler task or a task that has determined that an additional NP VM should be initiated in response to an increased demand. Alternatively, the request may be initiated manually by an operator 27 via a VM user interface (not illustrated). The hypervisor 20 accesses the NP VMEXIT configuration 22-2, and based at least in part on the NP VMEXIT configuration 22-2, generates a NP VMCS 28 that, among other things, controls the VMEXIT behavior of a VM that is associated with the NP VMCS 28. It should be noted that while the NP VMEXIT configuration 22-2 has been illustrated as having a particular format, the examples are not limited to any particular format. In some implementations, the NP VMEXIT configuration 22-2 can have the format of a VMCS, and the particular field or fields that control VMEXIT behavior may have values that correspond to the actions identified in the entries 26-1-26-N. In such implementation, the hypervisor 20 may copy the NP VMEXIT configuration 22-2 as the NP VMCS 28, and then modify the NP VMCS 28 as otherwise appropriate for the particular VM that will be associated with the NP VMCS 28.

The hypervisor 20 then initiates a NP VM 30 that is associated with the NP VMCS 28. The hypervisor 20 associates a virtual central processing unit (VCPU) 32 with the NP VM 30. The VCPU 32 has associated information and registers, including, by way of non-limiting example, a PMU MSR 34. The NP VM 30 includes a guest OS 36. The guest OS 36 includes, or initiates, a task 38. The task 38 attempts to execute a read instruction on the PMU MSR 34. In accordance with the entry 26-1 of the NP VMEXIT configuration 22-2, the attempt to read the PMU MSR 34 results in a VMEXIT. The VMEXIT transfers control to the hypervisor 20. The hypervisor 20 determines that the task 38 attempted to read the PMU MSR 34 and performs some action, such as terminating the task 38.

Assume that the hypervisor 20 now receives a request to initiate a HP VM on the host computer 12. The request may be programmatic, such as from a scheduler task or a task that has determined that an additional HP VM should be initiated in response to an increased demand. Alternatively, the request may be initiated manually by the operator 27 via the VM user interface (not illustrated). The request may include a designated number of processor cores to reserve for the HP VM, which, in this example, is two processor cores. The hypervisor 20 determines if two processor cores 18 are available and can be reserved for sole use by the HP VM. If not, the hypervisor 20 rejects the request to initiate the HP VM. If the designated number of processor cores 18 are available and can be reserved for sole use by the HP VM, the hypervisor 20 accesses the HP VMEXIT configuration 22-1 and, based at least in part on the HP VMEXIT configuration 22-1, generates a number of HP VMCSs 40-1, 40-2 equal to the designated number of processor cores 18 (e.g., in this example, two) that, among other things, control the VMEXIT behavior of a VM that is associated with the HP VMCSs 40. As discussed above with regard to the NP VMEXIT configuration 22-2, it should be noted that, while the HP VMEXIT configuration 22-1 has been illustrated as having a particular format, the examples are not limited to any particular format. In some implementations, the HP VMEXIT configuration 22-1 can have the format of a VMCS, and the particular field or fields that control VMEXIT behavior may have values that correspond to the actions identified in the entries 24-1-24-N. In such implementation, the hypervisor 20 may copy the HP VMEXIT configuration 22-1 as the HP VMCSs 40-1, 40-2, and then modify the HP VMCSs 40-1, 40-2 as otherwise appropriate for the particular VM that will be associated with the HP VMCSs 40-1, 40-2.

In some embodiments, the hypervisor 20 may preconfigure extended page tables (EPTs) 41 for an amount of memory 16 requested for the HP VM. The EPTs 41 map an entire memory address range that contains the amount of memory 16 requested for the HP VM. The hypervisor 20 may configure the EPTs 41 to "pin" such memory 16 to the HP VM so that such memory 16 will not be allocated to any other VM, and may mark the pages of the EPTs 41 as non-swappable so that the memory pages stay resident in host memory, and are not swapped out. Configuring the EPTs 41 in this manner ensures that when the processor device 14 accesses the EPTs 41 for guest physical address to host physical address translation, there will be no EPT page faults. If for any reason the hypervisor 20 is unable to either reserve the number of requested processor cores 18, or reserve the requested amount of memory 16, the hypervisor 20 may reject the request to initiate the HP VM.

The hypervisor 20 then initiates a HP VM 42 that is associated with the HP VMCSs 40-1, 40-2. Prior to or substantially concurrently with initiating the HP VM 42 (i.e., within a second or two of initiating the HP VM 42), the hypervisor 20 may set a timer 44 to a predetermined value. The hypervisor 20 associates a number of VCPUs 46-1-46-2 with the HP VM 42 that is equal to the number of reserved processor cores 18 (e.g., in this example, two). Each VMCS 40-1, 40-2 corresponds to one of the VCPUs 46-1-46-2. The VCPU 46-1 includes a PMU MSR 48-1, and the VCPU 46-2 includes a PMU MSR 48-2. The hypervisor 20 "pins" two processor cores 18, such as the processor core 18-1 and the processor core 18-2 to the VCPUs 46-1 and 46-2, respectively, to reserve the processor cores 18-1, 18-2 for exclusive use by the HP VM 42. The HP VMCS 40-1 governs VMEXIT behavior of the processor core 18-1 and the HP VMCS 40-2 governs VMEXIT behavior of the processor core 18-2.

The HP VM 42 includes a guest OS 50. The guest OS 50 includes, or initiates, a task 52. The task 52 attempts to execute a read instruction on the PMU MSR 48-1. In accordance with the entry 24-1 of the HP VMEXIT configuration 22-1, an attempt to read a PMU MSR will not result in a VMEXIT. Thus, the task 52 successfully executes the read instruction on the PMU MSR 48-1 and obtains the value of the PMU MSR 48-1 without causing a VMEXIT. Similarly, the task 52 may implement any of the actions identified in the entries 24-1-25-5, and 24-N without a VMEXIT occurring.

At a subsequent point in time, the hypervisor 20 determines that the timer 44 has expired. The hypervisor 20 determines that the HP VM 42 is still executing and, in response to the timer 44 expiring, automatically terminates the HP VM 42.

Figure 2:
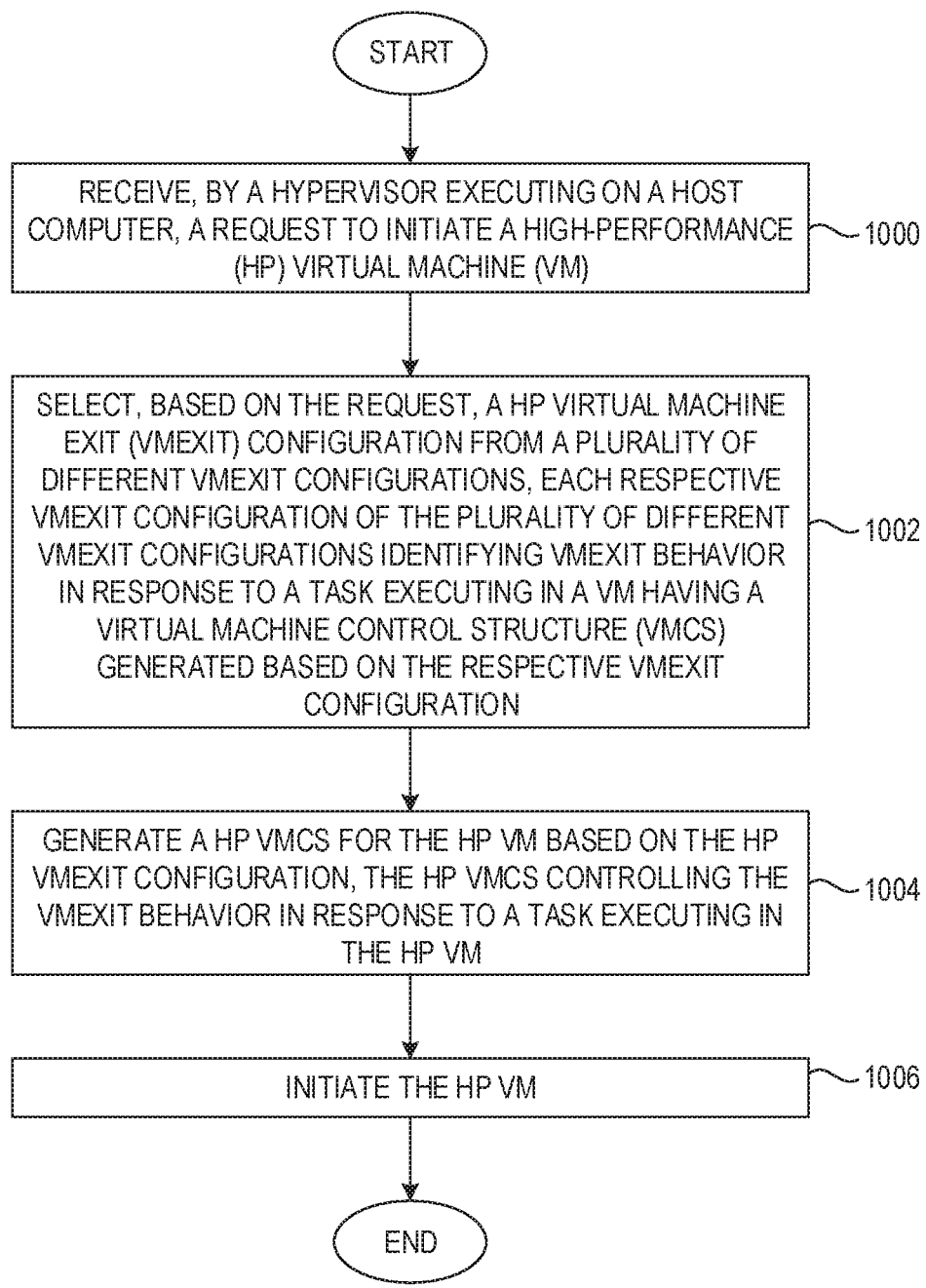
FIG. 2 is a flowchart of a method for implementing high-performance virtual machines for bare metal simulation according to one example.

FIG. 2 is a flowchart of a method for implementing high-performance virtual machines for bare metal simulation according to one example. FIG. 2 will be discussed in conjunction with FIG. 1. The hypervisor 20, executing on the host computer 12, receives a request to initiate a high-performance (HP) virtual machine (VM) (FIG. 2, block 1000). The hypervisor 20 selects, based on the request, the HP virtual machine exit (VMEXIT) configuration 22-1 from the plurality of different VMEXIT configurations 22-1-22-2, each respective VMEXIT configuration 22 of the plurality of different VMEXIT configurations 22 identifying VMEXIT behavior in response to a task executing in a VM having a virtual machine control structure (VMCS) generated based on the respective VMEXIT configuration 22 (FIG. 2, block 1002). The hypervisor 20 generates the HP VMCSs 40-1, 40-2 for the HP VM 42 based on the HP VMEXIT configuration 22-1, the HP VMCSs 40-1, 40-2 controlling the VMEXIT behavior in response to a task executing in the HP VM 42 (FIG. 2, block 1004). The hypervisor 20 initiates the HP VM 42 (FIG. 2, block 1006).

Figure 3:
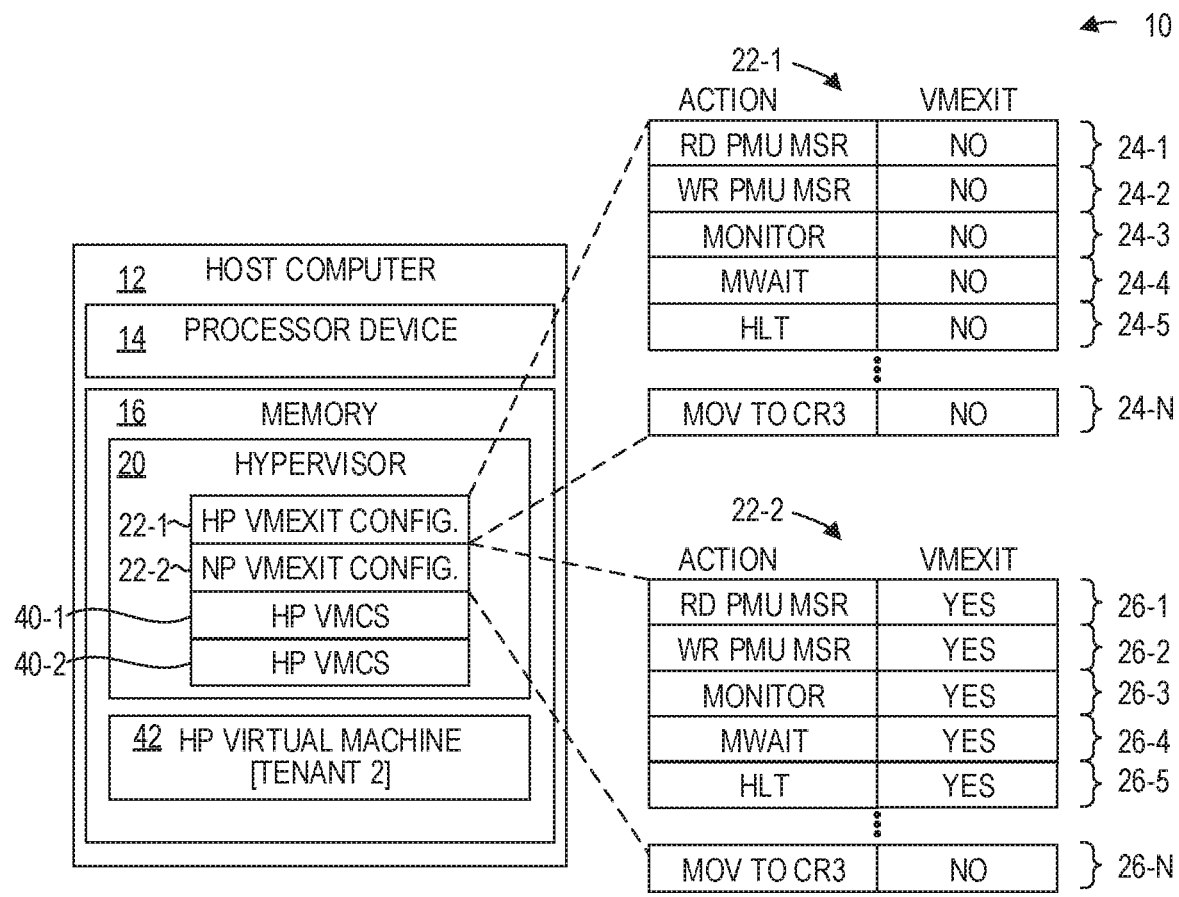
FIG. 3 is a simplified block diagram of the environment illustrated in FIG. 1 according to one implementation.

FIG. 3 is a simplified block diagram of the environment 10 illustrated in FIG. 1 according to one implementation. The host computer 12 includes the memory 16 and the processor device 14 coupled to the memory 16. The processor device 14 is to receive, by the hypervisor 20, a request to initiate a high-performance (HP) virtual machine (VM). The processor device 14 is to select, based on the request, the HP virtual machine exit (VMEXIT) configuration 22-1 from the plurality of different VMEXIT configurations 22-1-22-2, each respective VMEXIT configuration 22 of the plurality of different VMEXIT configurations 22 identifying VMEXIT behavior in response to a task executing in a VM having a virtual machine control structure (VMCS) generated based on the respective VMEXIT configuration 22. The processor device 14 is to generate the HP VMCSs 40-1, 40-2 for the HP VM 42 based on the HP VMEXIT configuration 22-1, the HP VMCSs 40-1, 40-2 controlling the VMEXIT behavior in response to a task executing in the HP VM 42. The processor device 14 is to initiate the HP VM 42.

Figure 4:
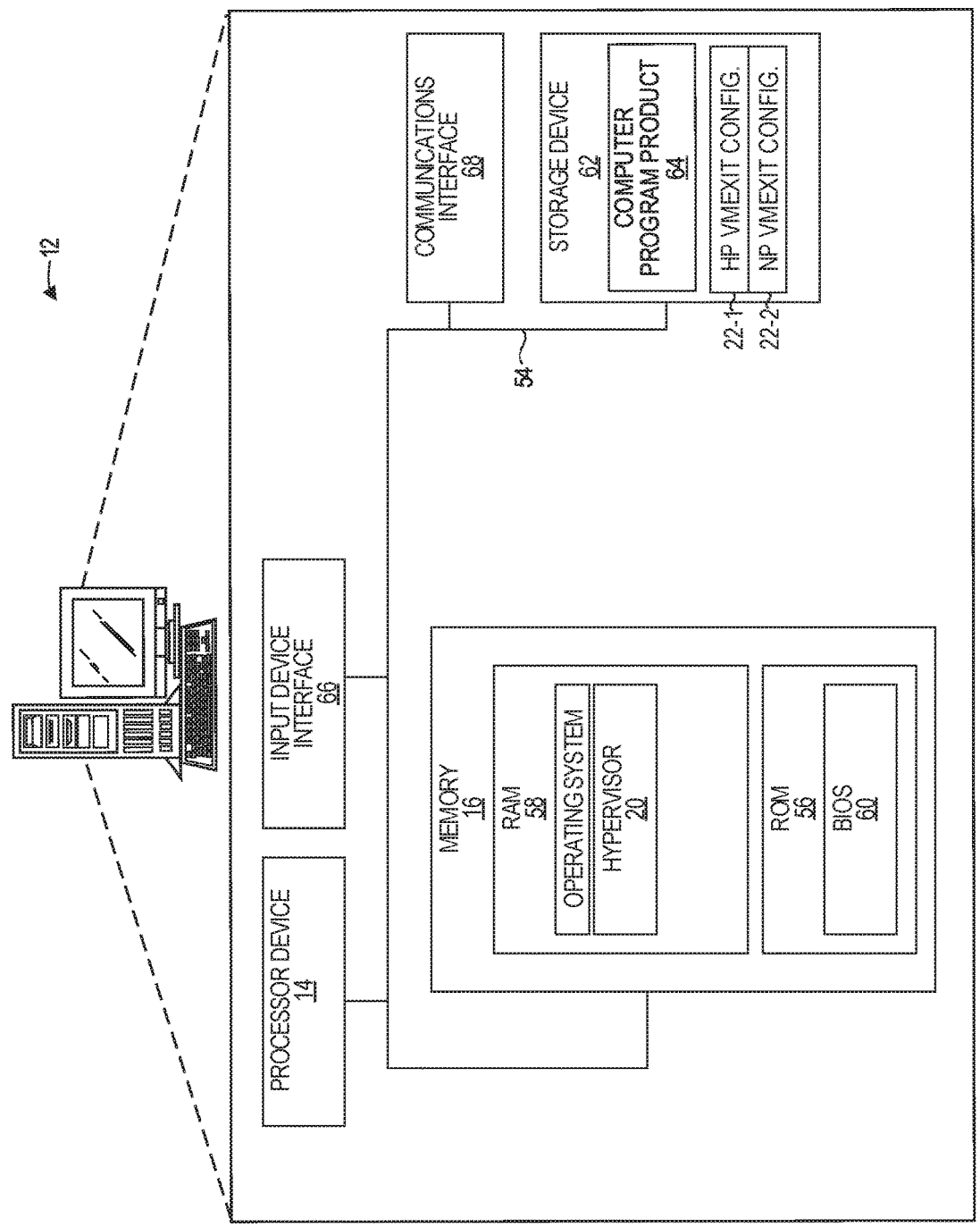
FIG. 4 is a block diagram of a host computer suitable for implementing high-performance virtual machines for bare metal simulation according to one example.

FIG. 4 is a block diagram of the host computer 12 suitable for implementing examples according to one example. The host computer 12 may comprise any computing or electronic device capable of including firmware, hardware, and/or executing software instructions to implement the functionality described herein, such as a computer server, a desktop computing device, a laptop computing device, or the like. The host computer 12 includes the processor device 14, the memory 16, and a system bus 54. The system bus 54 provides an interface for system components including, but not limited to, the memory 16 and the processor device 14. The processor device 14 can be any commercially available or proprietary processor.

The system bus 54 may be any of several types of bus structures that may further interconnect to a memory bus (with or without a memory controller), a peripheral bus, and/or a local bus using any of a variety of commercially available bus architectures. The memory 16 may include non-volatile memory 56 (e.g., read-only memory (ROM), erasable programmable read-only memory (EPROM), electrically erasable programmable read-only memory (EEPROM), etc.), and volatile memory 58 (e.g., random-access memory (RAM)). A basic input/output system (BIOS) 60 may be stored in the non-volatile memory 56 and can include the basic routines that help to transfer information between elements within the host computer 12. The volatile memory 58 may also include a high-speed RAM, such as static RAM, for caching data.

The host computer 12 may further include or be coupled to a non-transitory computer-readable storage medium such as a storage device 62, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 62 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. The storage device 62 may store the plurality of VMEXIT configurations 22-1, 22-2.

A number of modules can be stored in the storage device 62 and in the volatile memory 58, including an operating system and one or more program modules, such as the hypervisor 20, which may implement the functionality described herein in whole or in part.

All or a portion of the examples may be implemented as a computer program product 64 stored on a transitory or non-transitory computer-usable or computer-readable storage medium, such as the storage device 62, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the hypervisor 20 in the volatile memory 58, may serve as a controller, or control system, for the host computer 12 that is to implement the functionality described herein.

The operator 27 may also be able to enter one or more configuration commands through a keyboard, a pointing device such as a mouse (not illustrated), or a touch-sensitive surface such as a display device. Such input devices may be connected to the processor device 14 through an input device interface 66 that is coupled to the system bus 54 but can be connected by other interfaces such as a parallel port, an Institute of Electrical and Electronic Engineers (IEEE) 1394 serial port, a Universal Serial Bus (USB) port, an IR interface, and the like. The host computer 12 may also include a communications interface 68, such as an Ethernet transceiver or the like, that suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a hypervisor executing on a host computer, a request to initiate a high-performance (HP) virtual machine (VM);
   selecting, based on the request, a predetermined HP virtual machine exit (VMEXIT) configuration template from a plurality of different predetermined VMEXIT configuration templates, each respective predetermined VMEXIT configuration template of the plurality of different predetermined VMEXIT configuration templates identifying VMEXIT behavior in response to a task executing in a VM having a virtual machine control structure (VMCS) generated based on the respective predetermined VMEXIT configuration template;

prior to initiating the HP VM, generating a HP VMCS for the HP VM based on the predetermined HP VMEXIT configuration template, the HP VMCS controlling the VMEXIT behavior in response to a task executing in the HP VM; and initiating the HP VM.

2. The method of claim 1 further comprising:
setting a timer associated with the initiation of the HP VM;
determining that the timer has expired; and
in response to determining that the timer has expired, terminating the HP VM.

3. The method of claim 1 further comprising:
identifying a subset of processor cores of a plurality of processor cores of the host computer; and
pinning the subset of processor cores to the HP VM such that no other VM executing on the host computer can utilize any processor core in the subset of processor cores.

4. The method of claim 1 further comprising:
receiving, by the hypervisor, a request to initiate a normal-performance (NP) VM;
selecting, based on the request, a NP VMEXIT configuration template from the plurality of different predetermined VMEXIT configuration templates;
generating a NP VMCS for the NP VM based on the NP VMEXIT configuration template, the NP VMCS controlling the VMEXIT behavior in response to a task executing in the NP VM; and
initiating the NP VM.

5. The method of claim 1 wherein the predetermined HP VMEXIT configuration template identifies a first set of actions that, if taken by a process, causes a VMEXIT, and a NP VMEXIT configuration template of the plurality of predetermined VMEXIT configuration templates identifies a second set of actions that, if taken by a process, causes a VMEXIT, and wherein the first set of actions comprises a fewer number of actions than the second set of actions.

6. The method of claim 5 wherein the NP VMEXIT configuration template indicates that a read operation of a performance monitoring unit (PMU) model specific register (MSR) by a process and/or a write operation of a PMU MSR by a process will cause a VMEXIT, and wherein the predetermined HP VMEXIT configuration template indicates that a read operation of a PMU MSR by a process and/or a write operation of a PMU MSR by a process will not cause a VMEXIT.

7. The method of claim 5 wherein the NP VMEXIT configuration template indicates that execution of an x86 instruction set MONITOR instruction by a process and/or execution of an x86 instruction set MWAIT instruction by a process will cause a VMEXIT, and wherein the predetermined HP VMEXIT configuration template indicates that execution of the x86 instruction set MONITOR instruction by a process and/or execution of the x86 instruction set MWAIT instruction by a process will not cause a VMEXIT.

8. The method of claim 5 wherein the NP VMEXIT configuration template indicates that execution of an x86 instruction set HLT instruction by a process will cause a VMEXIT, and wherein the predetermined HP VMEXIT configuration template indicates that execution of the x86 instruction set HLT instruction by a process will not cause a VMEXIT.

9. The method of claim 1 wherein the request includes a designated number of processor cores, and further comprising determining, by the hypervisor, that the designated number of processor cores of a plurality of processor cores of the host computer can be reserved for use by only the HP VM.

10. The method of claim 1 wherein the predetermined HP VMEXIT configuration template has a format of a VMCS, and wherein one or more fields of the predetermined HP VMEXIT configuration template have values that control VMEXIT behavior, and wherein generating the HP VMCS comprises copying the predetermined HP VMEXIT configuration template as the HP VMCS.

11. A host computer comprising:
a memory;
a processor device coupled to the memory to:
receive, by a hypervisor, a request to initiate a high-performance (HP) virtual machine (VM);
select, based on the request, a predetermined HP virtual machine exit (VMEXIT) configuration template from a plurality of different predetermined VMEXIT configuration templates, each respective predetermined VMEXIT configuration template of the plurality of different predetermined VMEXIT configuration templates identifying VMEXIT behavior in response to a task executing in a VM having a virtual machine control structure (VMCS) generated based on the respective predetermined VMEXIT configuration template;
prior to initiating the HP VM, generate a HP VMCS for the HP VM based on the predetermined HP VMEXIT configuration template, the HP VMCS controlling the VMEXIT behavior in response to a task executing in the HP VM; and
initiate the HP VM.

12. The host computer of claim 11 wherein the processor device is further to:
set a timer associated with the initiation of the HP VM;
determine that the timer has expired; and
in response to determining that the timer has expired, terminate the HP VM.

13. The host computer of claim 11 wherein the processor device is further to:
identify a subset of processor cores of a plurality of processor cores of the host computer; and
pin the subset of processor cores to the HP VM such that no other VM executing on the host computer can utilize any processor core in the subset of processor cores.

14. The host computer of claim 11 wherein the processor device is further to:
receive, by the hypervisor, a request to initiate a normal-performance (NP) VM;
select, based on the request, a NP VMEXIT configuration template from the plurality of different predetermined VMEXIT configuration templates;
generate a NP VMCS for the NP VM based on the NP VMEXIT configuration template, the NP VMCS controlling the VMEXIT behavior in response to a task executing in the NP VM; and
initiate the NP VM.

15. The host computer of claim 11 wherein the predetermined HP VMEXIT configuration template identifies a first set of actions that, if taken by a process, cause a VMEXIT, and a NP VMEXIT configuration template of the plurality of predetermined VMEXIT configuration templates identifies a second set of actions that, if taken by a process, cause a VMEXIT, and wherein the first set of actions comprises a fewer number of actions than the second set of actions.

16. The host computer of claim 11 wherein the request includes a designated number of processor cores, and wherein the processor device is further to determine, by the hypervisor, that the designated number of processor cores of a plurality of processor cores of the host computer can be reserved for use by only the HP VM.

17. A computer program product stored on a non-transitory computer-readable storage medium and including instructions to cause a processor device to:
   receive, by a hypervisor, a request to initiate a high-performance (HP) virtual machine (VM);
   select, based on the request, a predetermined HP virtual machine exit (VMEXIT) configuration template from a plurality of different predetermined VMEXIT configuration templates, each respective predetermined VMEXIT configuration template of the plurality of different predetermined VMEXIT configuration templates identifying VMEXIT behavior in response to a task executing in a VM having a virtual machine control structure (VMCS) generated based on the respective predetermined VMEXIT configuration template;
   prior to initiating the HP VM, generate a HP VMCS for the HP VM based on the predetermined HP VMEXIT configuration template, the HP VMCS controlling the VMEXIT behavior in response to a task executing in the HP VM; and
   initiate the HP VM.

18. The computer program product of claim 17 wherein instructions further cause the processor device to:
   identify a subset of processor cores of a plurality of processor cores of the host computer; and
   pin the subset of processor cores to the HP VM such that no other VM executing on the host computer can utilize any processor core in the subset of processor cores.

19. The computer program product of claim 17 wherein instructions further cause the processor device to:
   receive, by the hypervisor, a request to initiate a normal-performance (NP) VM;
   select, based on the request, a NP VMEXIT configuration template from the plurality of different predetermined VMEXIT configuration templates;
   generate a NP VMCS for the NP VM based on the NP VMEXIT configuration template, the NP VMCS controlling the VMEXIT behavior in response to a task executing in the NP VM; and
   initiate the NP VM.

20. The computer program product of claim 17 wherein the predetermined HP VMEXIT configuration template identifies a first set of actions that, if taken by a process, cause a VMEXIT, and a NP VMEXIT configuration template of the plurality of predetermined VMEXIT configuration templates identifies a second set of actions that, if taken by a process, cause a VMEXIT, and wherein the first set of actions comprises a fewer number of actions than the second set of actions.

* * * * *